United States Patent
Fremerey et al.

(10) Patent No.: US 7,082,763 B2
(45) Date of Patent: Aug. 1, 2006

(54) EXHAUST GAS TURBOCHARGER

(75) Inventors: John K. Fremerey, Bonn (DE); Matthias Lang, Zittau (DE); Jens-Wolf Jaisle, Billiers (FR)

(73) Assignees: Forschungszentrum Julich GmbH, Julich (DE); Borgwarner Inc., Auburn Hills, MI (US)

( * ) Notice: Subject to any disclaimer, the term of this patent is extended or adjusted under 35 U.S.C. 154(b) by 9 days.

(21) Appl. No.: 10/510,735

(22) PCT Filed: Mar. 8, 2003

(86) PCT No.: PCT/EP03/02389

§ 371 (c)(1),
(2), (4) Date: Oct. 12, 2004

(87) PCT Pub. No.: WO03/087581

PCT Pub. Date: Oct. 23, 2003

(65) Prior Publication Data

US 2005/0198956 A1    Sep. 15, 2005

(30) Foreign Application Priority Data

Apr. 12, 2002  (DE) ................................ 102 16 447

(51) Int. Cl.
| F01D 25/16 | (2006.01) |
| F02B 39/00 | (2006.01) |
| F04B 17/00 | (2006.01) |
| F04B 35/02 | (2006.01) |
| F04D 25/04 | (2006.01) |
| F16C 39/06 | (2006.01) |
| H02K 7/09 | (2006.01) |

(52) U.S. Cl. ...................... 60/598; 60/605.1; 310/90.5; 417/361; 417/365

(58) Field of Classification Search ............... 60/605.1, 60/598; 417/407, 361, 365; 310/90.5; 384/624; 415/58.5, 111, 213.1; 123/559.1, 564
See application file for complete search history.

(56) References Cited

U.S. PATENT DOCUMENTS

| 5,248,239 | A | * | 9/1993 | Andrews ..................... 417/407 |
| 5,310,311 | A | * | 5/1994 | Andres et al. ............. 310/90.5 |
| 5,836,739 | A | * | 11/1998 | Haramura et al. .......... 415/104 |
| 6,310,414 | B1 | * | 10/2001 | Agahi et al. ................ 415/104 |
| 6,368,075 | B1 | * | 4/2002 | Fremerey ................... 310/90.5 |
| 6,727,617 | B1 | * | 4/2004 | McMullen et al. ........ 310/90.5 |
| 6,846,167 | B1 | * | 1/2005 | Jaisle ......................... 417/407 |
| 2003/0155829 | A1 | * | 8/2003 | McMullan et al. ........ 310/90.5 |
| 2004/0088976 | A1 | * | 5/2004 | Jaisle ......................... 417/407 |

* cited by examiner

Primary Examiner—Sheldon J Richter

(74) Attorney, Agent, or Firm—Berenato, White & Stavish, LLC

(57) ABSTRACT

The invention concerns an exhaust gas turbocharger (1) having a shaft (2) on which a turbine wheel (4) and a compressor wheel (3) sit and which is guided in radial bearings (5, 6) and in at least one axial bearing (9), which is characterized in that the radial bearings (5, 6) are embodied as passive magnetic bearings having permanent magnets (23 through 31) generating axial magnetic fluxes; and the axial bearing (9) is embodied as an active magnetic bearing having an electromagnet (55), an axial sensor, and a controller for controlling the electrical current impinging upon the electromagnet (55).

32 Claims, 3 Drawing Sheets

EXHAUST GAS TURBOCHARGER

The invention concerns an exhaust gas turbocharger having a shaft on which a turbine wheel and a compressor wheel sit and which is guided in radial bearings and in at least one axial bearing.

Exhaust gas turbochargers serve to improve the efficiency and thus increase the output of internal combustion engines. They comprise a shaft that is equipped at one end with a turbine wheel and at the other end with a compressor wheel. The turbine wheel is impinged upon by the exhaust gas flow of the internal combustion engine, the kinetic energy of the exhaust gas being substantially converted by the turbine wheel into a rotary motion. The shaft drives the compressor wheel, which draws in fresh air and causes it to flow with positive pressure into the intake ducts of the internal combustion engine, thus improving volumetric efficiency.

Severe demands are imposed on the bearing system for exhaust gas turbocharger shafts. On the one hand, the shaft reaches high rotation speeds of up to 300,000 rpm. On the other hand, the exhaust gas turbochargers and thus their bearings are exposed to high temperatures. A further problem is that the exhaust gas flow striking the turbine wheel generates strong axial forces that must be absorbed in an axial bearing. Because of the high rotation speeds, the rotating parts of the exhaust gas turbocharger must be very accurately balanced so that as few vibrations as possible are generated. With all of this, care must additionally be taken that the very wide temperature range in which an exhaust gas turbocharger operates does not result in distortions of the bearings as a result of material expansion.

The bearings hitherto used for the shaft have hitherto been exclusively plain or rolling bearings. In view of the aforementioned stresses, they are subject to considerable wear and, along with their lubrication, are responsible for approximately 80% of the failures in an exhaust gas turbocharger.

It is the object of the invention to configure the bearing system of an exhaust gas turbocharger in such a way that it has as little wear as possible, is less subject to malfunction, and has no tendency to vibrate.

According to the present invention, this object is achieved in that the radial bearings are embodied as passive magnetic bearings having permanent magnets generating axial magnetic fluxes; and the axial bearing is embodied as an active magnetic bearing having an electromagnet, an axial sensor, and a controller for controlling the electrical current impinging upon the electromagnet. The basic idea of the invention is thus to support the exhaust gas turbocharger shaft in entirely magnetic fashion, by the fact that the shaft is held in floating fashion in the magnetic bearings and no mechanical contact exists with stationary parts, and there is therefore also no mechanical friction. The magnetic bearing system for the exhaust gas turbocharger shaft does not constitute an upper limit in terms of rotation speed. It is moreover characterized by better efficiency in the absence of mechanical friction. A magnetic bearing system is also maintenance-free and requires no lubrication.

Magnetic bearings have been proposed in many embodiments in other fields of technology, for example in vacuum pumps, blood pumps, gyroscopic devices, or in spinning rotors. Purely by way of example, the reader is referred to the following documents out of the many publications disclosed in this context: U.S. Pat. Nos. 3,976,339, 5,315,197, 5,514,924, 4,620,752, WO 92/15795, U.S. Pat. No. 5,729,065, WO 00/64030, WO 00/64031. Although such bearing systems have already been known for some time, and exhaust gas turbochargers have likewise been in common use for decades, because of the stringent requirements it has apparently not been conceivable that the shaft of an exhaust gas turbocharger can be supported in entirely magnetic fashion.

In the present case this is done by the fact that at least two passive magnetic bearings are combined with one active magnetic bearing. More than two passive and more than one active magnetic bearing can also be present, and the active and passive magnetic bearing can form a unit. The passive magnetic bearings have permanent magnets in the stationary part and usefully also in the rotating part, said magnets being arranged so that in the gaps between the rotating and stationary parts, an axial attractive magnetic flux is generated that opposes any radial displacement of the shaft. By way of the strength, number, and arrangement of the permanent magnets it is thus possible to generate a magnetic flux which is sufficiently strong that the shaft is held in floating fashion even when strong external forces are applied. Balancing of the shaft is no longer necessary, or at least need not be as laborious as with previously known exhaust gas turbochargers. It is worth considering in this context that the balancing process can account for up to 15% of the manufacturing cost of the exhaust gas turbocharger.

The axial instability of the shaft is compensated for by the electromagnetic axial bearing, which is part of a control loop having a controller that comprises a sensor for sensing the axial motion of the shaft. Active electromagnetic axial bearings of this kind are known per se in the existing art (cf. U.S. Pat. Nos. 5,315,197, 4,620,752, WO 92/15795, U.S. Pat. No. 5,729,065). The controller adjusts the current acting on the coil, in terms of polarity and strength, in such a way that the coil generates a magnetic field that acts axially on the shaft and is opposite to the respective deflection of the shaft in the axial direction, and thus moves the shaft back into the defined position. This happens so quickly that the shaft executes practically no axial motions.

It has been found in this context that with an active magnetic bearing of this kind it is possible to absorb even the large axial forces that occur in exhaust gas turbochargers. The possibility also exists of axially preloading the axial bearing, using additional permanent magnets, in such a way that the average axial force acting on the shaft during operation is absorbed by these permanent magnets, and the electromagnet is impinged upon by electrical current only in order to compensate for axial forces greater than or less than the average value. The electrical current to be expended for axial stabilization can thereby be kept low.

In an embodiment of the invention, provision is made for two radial bearings to be present, between which at least one axial bearing is arranged. The radial bearings within the turbocharger should have the greatest possible spacing so as to yield a large lever arm for any tilting motions of the shaft that may occur.

In a particularly preferred embodiment, it is proposed that the axial bearing have a radially projecting bearing ring made of magnetizable material and at least one yoke, made of ferromagnetic material and forming an axial bearing stator, that encloses the bearing ring on both sides of the bearing ring forming magnetic gaps; and that at least one pair of axially oppositely polarized permanent magnets be arranged axially next to one another in the yoke, and an electromagnetic coil also be arranged radially adjacently as the electromagnet, the magnetic flux in the coil and thus in the magnetic gaps being controllable by way of the controller in such a way that the bearing ring is held in the yoke axially in a defined position.

The basic idea of this particular embodiment is that the axial bearing comprises a combination of a yoke, a coil, and two oppositely polarized permanent magnets arranged axially next to one another, the coil and permanent magnets lying radially next to one another. Four partial magnetic fluxes are thus constituted in the yoke, of which two are located axially and two radially next to one another. Two of the partial magnetic fluxes penetrate the bearing ring connected to the shaft, and generate axially and oppositely directed magnetic fields in the magnetic gaps. The other two partial magnetic fluxes penetrate into the yoke from the outside. The magnetic fields in the magnetic gaps on the bearing ring can be asymmetrically influenced by current impingement on the coil, in such a way that the magnetic field is strengthened in the one magnetic gap and weakened in the other. An axial force is thus exerted on the bearing ring and thus on the shaft. This force counteracts any axial offset of the shaft, the sensor of the controller sensing this axial motion and controlling current delivery to the coil in such a way that the bearing ring and thus the shaft is axially centered in the yoke.

Although, as shown by the documents cited above, active axial bearings made up of a combination of electromagnetic coils and permanent magnets are already known, the embodiment claimed here is nevertheless distinguished from them by a simple physical configuration (only one coil is necessary) and by a large transfer of force in the axial direction, since only two magnetic gaps are present and the force/current characteristic of the coil is not negatively affected by the placement of the magnetically poorly conductive permanent magnets. The axial bearing according to the present invention is thus particularly suitable for absorbing the large axial forces that act on the shaft, and simultaneously holding the shaft in a defined position. It is understood in this context that multiple permanent magnets and/or coils can also be provided radially next to one another.

The possibility exists of arranging several axial bearings of the kind described above distributed over the circumference of the bearing ring. It is simpler in terms of design, however, to embody the axial bearing as an annular bearing having a yoke, configured as an annular yoke, that surrounds the bearing ring. The permanent magnets are advantageously embodied as axially magnetized annular magnets, and the coil as an annular coil.

To generate a magnetic flux with as little loss as possible, the permanent magnets should be in contact without gaps against the yoke and against each other. For the same reason, the coil should be in contact without gaps against the yoke and against the permanent magnets. Only the magnetic gaps between the bearing ring and yoke therefore remain.

According to a further feature of the invention, provision is made for the permanent magnets to be radially adjacent to the circumferential side of the radial web, and for the coil to sit on the radially outward side thereof. This results in a particularly favorable magnetic flux.

The radial bearings should each have a bearing ring sitting on the shaft, and a radial bearing stator located axially opposite that ring on at least one side, permanent magnets being provided both in the bearing ring and in the radial bearing stator. Several permanent magnets should be arranged next to one another in the radial direction, preferably being in contact with one another and being alternately oppositely polarized; i.e. each two adjacent permanent magnets on the radial bearing stator or on the bearing ring are oppositely polarized. Particularly large magnetic forces are thereby generated.

It is possible in principle for the radial bearing stators to have several partial stators, with permanent magnets, distributed over the circumference. It is simpler in terms of design, however, to embody the radial bearing stators as annular stators and the permanent magnets as annular magnets.

In principle, it is sufficient for a radial bearing stator to be associated with each bearing ring on only one side. The radial bearing stators can be arranged and embodied in such a way that the axial forces do not, as is normally the case, cancel one another out, but instead that an axial force, directed oppositely to the average axial force acting on the shaft during operation, is continuously generated in one direction. This can also be achieved with an embodiment in which the bearing ring is enclosed on both sides by radial bearing stators having permanent magnets. A particularly powerful magnetic flux, counteracting any radial deflection of the shaft, can thereby be achieved. It is understood that in this context, the radial bearings can also be configured differently, i.e. so that the bearing ring of the one radial bearing has a radial bearing stator on only one side, while the bearing ring of the other radial bearing has radial bearing stators on both sides. It is also understood that within one radial bearing, multiple bearing rings having a corresponding number of radial bearing stators can also be provided. This case refers simply to a series arrangement of multiple radial bearings.

If two radial bearing stators are provided in one radial bearing, they should preferably be combined into a yoke that is U-shaped in cross section.

Magnetic bearings have the property that they cause almost no damping. The present invention therefore provides that at least one radial bearing stator, preferably all the radial bearing stators, be supported via spring and damper elements in radially movable fashion on a housing-mounted part of the exhaust gas turbocharger. This can be done, for example, by means of axially extending torsion springs; the radial bearing stator can be connected to the housing-mounted part via several torsion springs distributed over the circumference. The torsion springs can each be part of a cage that connects the ends of the torsion springs via cage rings, and is coupled at one end to the radial bearing stator and at the other end to the housing-mounted part. To achieve a space-saving configuration, the cage should surround the respectively associated radial bearing stators.

It is additionally useful that the radial bearing stator suspended on spring elements is braced against the housing-mounted part by way of at least one damping element that damps the radial excursions of the spring elements. Each damping element can be embodied annularly and coaxially with respect to the shaft, and can be loaded either in compression or in shear. In a particular configuration, the damping element is embodied as a liquid film, preferably equipped with magnetic or magnetizable particles, the liquid film being magnetically impinged upon on at least one side by a permanent magnet that can be part of the passive magnetic bearing. The liquid film is thus magnetically trapped. The viscosity of the liquid film can be adapted to the respective damping requirements.

The invention is illustrated in more detail in the drawings, with reference to an exemplary embodiment. In the drawings.

Figure 1:
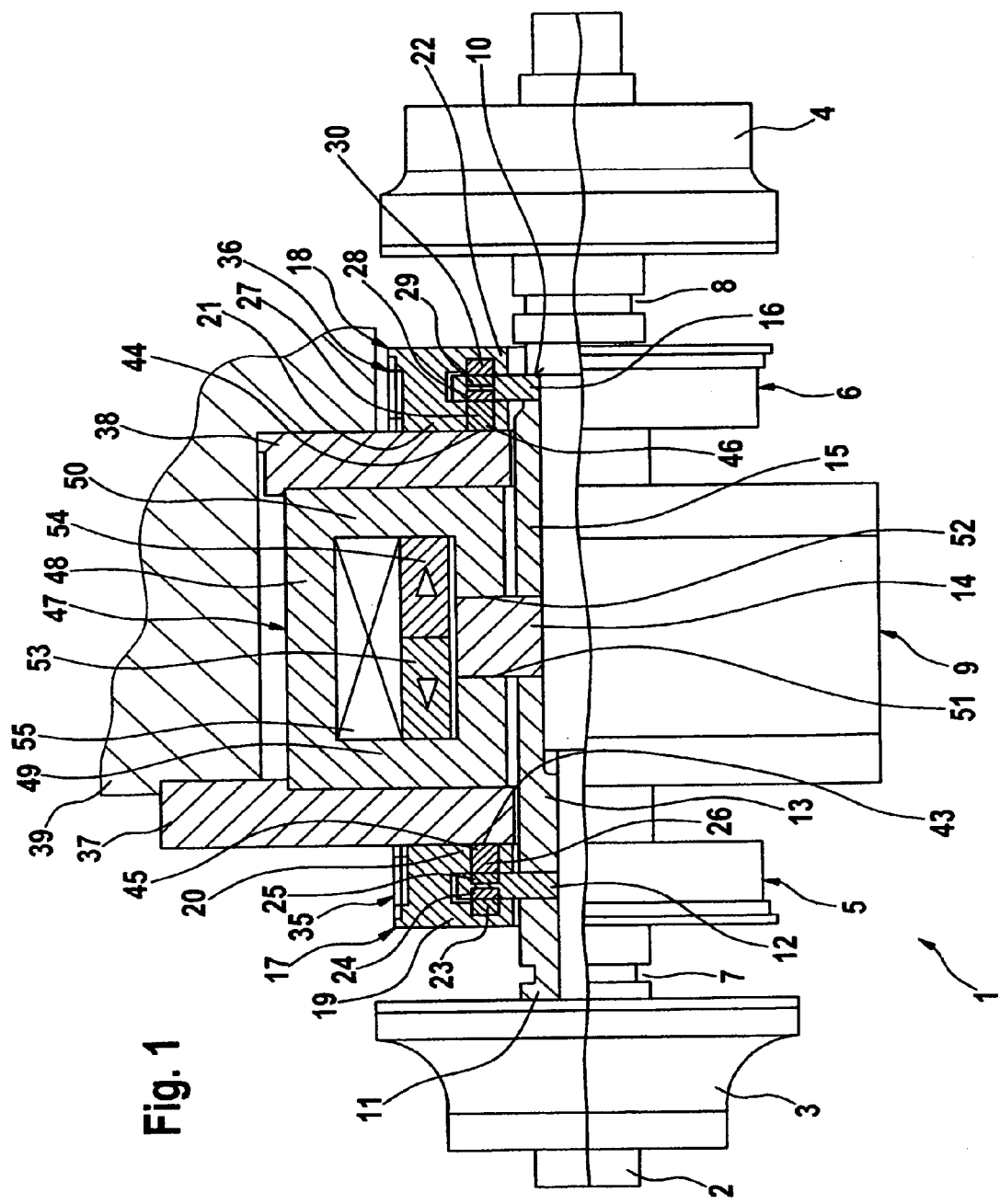
FIG. 1 is a side view of an exhaust gas turbocharger without the housing, with a partially sectioned depiction of the upper part of the shaft bearing system.

Exhaust gas turbocharger 1 depicted in FIG. 1 comprises a shaft 2 on whose left end sits a compressor wheel 3, and on whose right end sits a turbine wheel 4. Compressor wheel 3 is embodied, in a manner known per se, as a radial compressor.

Two radial bearings 5, 6 are located between compressor wheel 3 and turbine wheel 4. Radial bearings 5, 6 are adjacent to compressor wheel 3 and to turbine wheel 4, respectively. Arranged between them are grooves 7, 8 that serve to receive sealing rings, which constitute delimiting bearings having a typical clearance of approx. +/−0.15 mm. An axial bearing 9 is located between radial bearings 5, 6.

As is apparent from the upper part of FIG. 1, shaft 2 is surrounded by a total of six rings that are axially braced against a shoulder 10 on shaft 2. A first shaft sleeve 11 having groove 7 is followed by a bearing washer 12, a second shaft sleeve 13, a bearing washer 14, a third shaft sleeve 15, and a further bearing washer 16.

Bearing washers 12, 16 belong to radial bearings 5, 6. They are each enclosed on both sides by a yoke 17, 18 that is U-shaped in cross section and coaxially surrounds shaft 2, each yoke 17, 18 comprising a pair of radial bearing stators 19, 20 and 21, 22 that form the limbs of yokes 17, 18. Radial bearing stators 19, 20, 21, 22, and bearing washers 12, 16, have permanent magnets 23, 24, 25, 26 and 27, 28, 29, 30, which are located respectively opposite the two radial bearings 5, 6 in the axial direction. They are polarized in such a way that they attract one another, resulting in an axially directed and attractive magnetic field in the gaps between bearing washers 12, 16 and radial bearing stators 19, 20, 21, 22. The magnetic fields center shaft 2, a radial stiffness of 160 kN/m being achieved.

Figure 2:
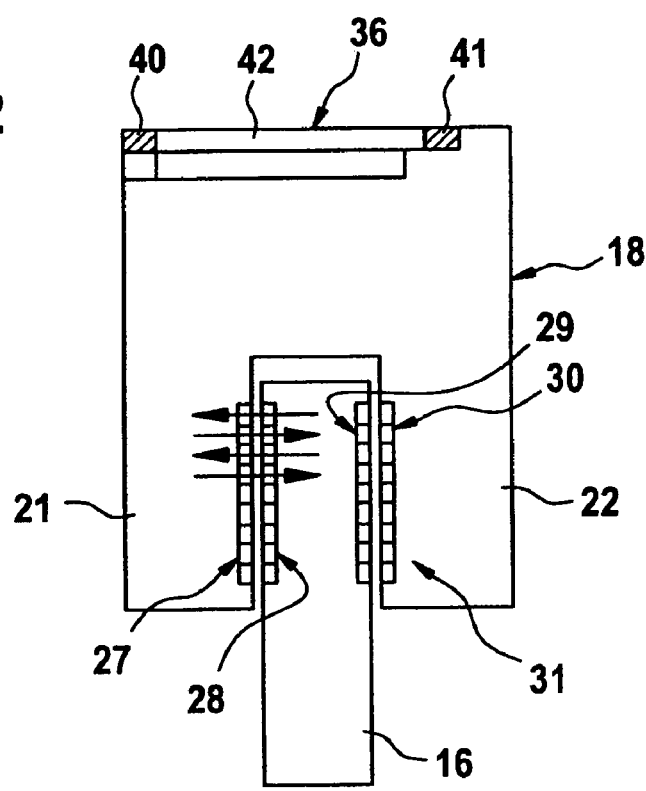
FIG. 2 is a cross section through a radial bearing of the exhaust gas turbocharger shown in FIG. 1.

Permanent magnets 23 through 30 each comprise nine annular magnets (labeled 31 by way of example) set coaxially in one another, as is evident from the enlarged depiction of radial bearing 6 in FIG. 2. The annular magnets 31 of a permanent magnet 23 through 30 are in contact against on another in the radial direction. Two annular magnets 31 adjacent in the radial direction are oppositely axially magnetized. The axially oppositely located annular magnets 31 of two adjacent permanent magnets 23 through 30 are polarized in mutually attractive fashion, so that an axial magnetic flux is produced.

Figure 3:
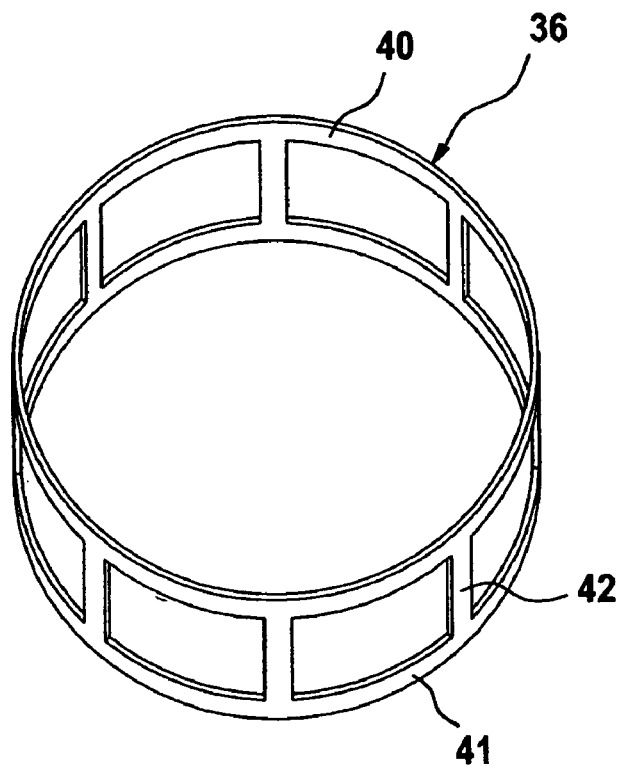
FIG. 3 is a perspective depiction of a spring cage for the radial bearing shown in FIG. 2.

Yokes 17, 18 are surrounded externally by spring cages 35, 36 (omitted in the lower part of FIG. 1) that are connected at the outer edge to yokes 17, 18 and at the inner edge to housing washers 37, 38 (omitted in the lower part of FIG. 1) that in turn are secured to a housing 39. Spring cage 36 is depicted individually in FIG. 3. At the edges it has two cage rings 40, 41 that are connected via eight regularly distributed spring struts (labeled 42 by way of example) extending in the axial direction. Spring struts 42 permit a mutual parallel displacement of the two cage rings 40, 41, in which context spring struts bend in the radial direction. Yokes 17, 18 can thus deflect radially.

Located between yokes 17, 18 and housing washers 37, 38 are narrow gaps, in each of which a damping ring 43, 44 is provided (FIG. 1). Damping rings 43, 44 are made of a highly viscous liquid film containing magnetic particles. The liquid film is stressed in shear in the context of a radial motion of yokes 17, 18 and thus acts in damping fashion. It is trapped in yokes 17, 18 by annular magnets 45, 46.

Bearing washer 14 belongs to axial bearing 9. It is enclosed on both sides by an annular yoke 47 made of sheet Si iron. Annular yoke 47 is enclosed and secured between the two housing washers 37, 38. It has an outer yoke shell 48 from which proceed two inwardly directed yoke limbs 49, 50 that have an L-shaped cross section and enclose bearing washer 14 with limb segments directed toward one another, two magnetic gaps 51, 52 being created. Located inside annular yoke 47 adjacent to the circumferential side of bearing washer 14 are two permanent magnets 53, 54, lying axially next to one another, which are polarized axially oppositely (symbolized by the triangles). They are in contact against one another and against yoke limbs 49, 50. They are surrounded by an electromagnetic annular coil 55 that fills up the space between permanent magnets 53, 54 and yoke shell 48 and yoke limbs 49, 50.

Figure 4:
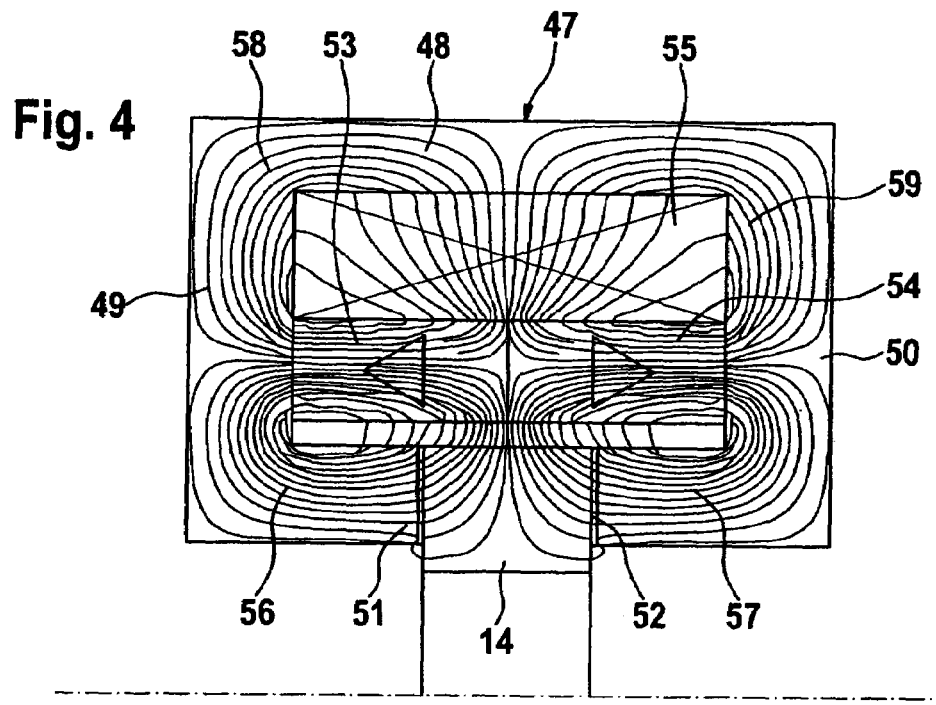
FIG. 4 is an enlarged depiction of the axial bearing of the exhaust gas turbocharger shown in FIG. 1.

As is evident in particular from FIG. 4, the two permanent magnets 53, 54 produce a total of four partial magnetic fluxes 56, 57, 58, 59, the adjacent partial magnetic fluxes 56, 57, 58, 59 being directed oppositely to one another in each case. The inner partial magnetic fluxes 56, 57 create axially directed magnetic fluxes in magnetic gaps 51, 52, so that the surfaces located opposite one another in magnetic gaps 51, 52 are mutually attracted. The magnetic forces cancel out when bearing washer 14 is in the center position. The outer partial magnetic fluxes 58, 59 pass through yoke limbs 49, 50 into yoke shell 48, and from there via annular coil 55 back into annular magnets 45, 46.

Figure 5:
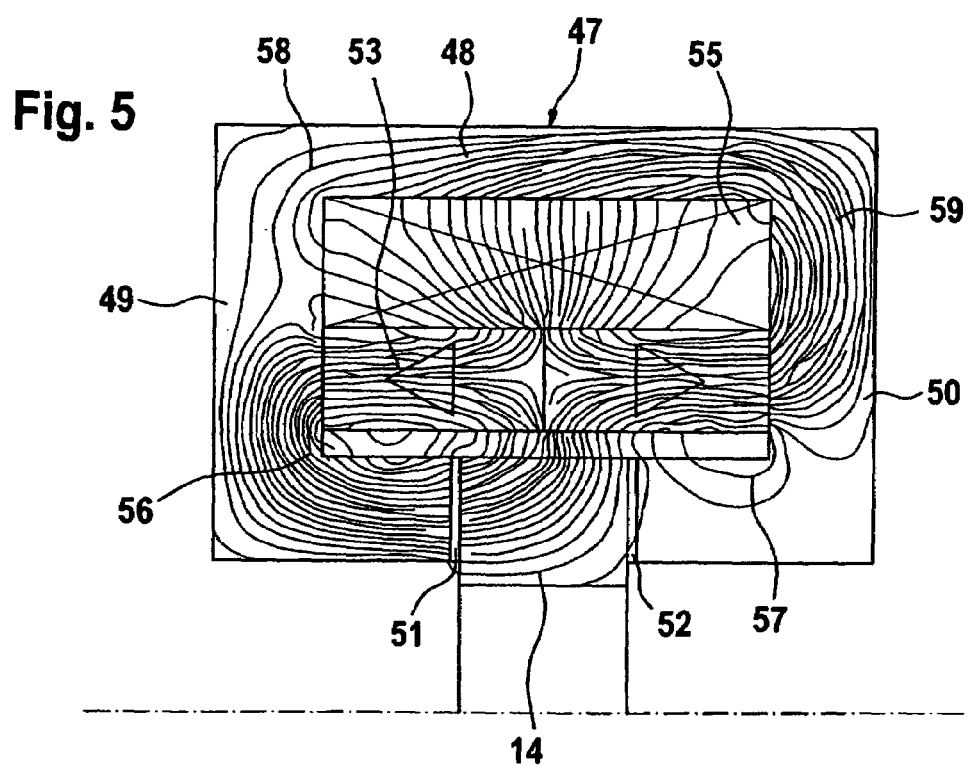
FIG. 5 shows the axial bearing according to FIG. 4 with active influencing of the magnetic flux.

Because of the magnetic instability of shaft 2 in the axial direction, an axial stabilization must be effected by way of axial bearing 9. This takes place, in the context of an axial excursion of bearing washer 14, by the fact that this excursion is sensed by a sensor (not depicted here and known in the existing art), and as a result the controller (also not depicted) controls the delivery of current to annular coil 55 in such a way that an additional magnetic flux is generated, resulting globally in an asymmetrical magnetic flux distribution within axial bearing 9. This is apparent from FIG. 5. In this case a minimal excursion of bearing washer to the right is present. As a result, annular coil 55 is impinged upon by an electrical current having a direction such that the diagonally opposite partial magnetic fluxes 56, 59 are strengthened (symbolized by the denser flux lines), and the other partial magnetic fluxes 57, 58 are weakened. As a result, the attractive force in left magnetic gap 51 increases, while the magnetic force in right magnetic gap 52 weakens. The axial excursion of bearing washer 14 to the right is therefore opposed by a magnetic attractive force in the axial direction, with the result that bearing washer 14 becomes centered again with respect to annular yoke 47.

The invention claimed is:

1. An exhaust gas turbocharger comprising:
   a shaft;
   turbine wheel on the shaft;
   a compressor wheel on the shaft;
   passive magnetic radial bearings guiding the shaft, the radial bearings comprising a bearing ring on the shaft, at least one radial bearing stator located axially opposite the bearing ring on at least one side, and permanent magnets provided both on the bearing rings and on the radial bearing stator for generating axial magnetic fluxes; and
   at least one active magnetic axial bearing guiding the shaft, the axial bearing comprising an electromagnet, an axial sensor, and a controller for controlling the electrical current impinging upon the electromagnet.

2. An exhaust gas turbocharger comprising a shaft on which a turbine wheel and a compressor wheel sit and which is guided in radial bearings and in at least one axial bearing,
wherein the radial bearings are embodied as passive magnetic bearings having first permanent magnets generating axial magnetic fluxes; and the axial bearing is embodied as an active magnetic bearing having an electromagnet, an axial sensor, and a controller for controlling the electrical current impinging upon the electromagnet, and
wherein the axial bearing has a radially projecting bearing ring, sitting on the shaft and made of magnetizable material, and at least one yoke, made of ferromagnetic material and forming at least one axial bearing stator, that encloses the bearing ring forming magnetic gaps; and at least one pair of axially oppositely polarized second permanent magnets are arranged axially next to one another in the yoke, and an electromagnetic coil is also arranged radially adjacently as the electromagnet, the magnetic flux in the coil and thus in the magnetic gaps being controllable by way of the controller in such a way that the bearing ring is held in the yoke axially in a defined position.

3. The exhaust gas turbocharger as defined in claim 2, wherein several axial bearings are provided, distributed over the circumference of the bearing ring.

4. The exhaust gas turbocharger as defined in claim 2, wherein the second permanent magnets are in contact against the yoke.

5. The exhaust gas turbocharger as defined in claim 2, wherein the second permanent magnets are in contact against each other.

6. The exhaust gas turbocharger as defined in claim 2, wherein the coil is in contact against the yoke.

7. The exhaust gas turbocharger as defined in claim 2, wherein the coil is in contact against the second permanent magnets.

8. The exhaust gas turbocharger as defined in claim 2, wherein the second permanent magnets are radially adjacent to the circumferential side of the radial ring, and the coil sits on the radially outward side thereof.

9. The exhaust gas turbocharger as defined in claim 2, wherein two of the radial bearings are present, between which the at least one axial bearing is arranged.

10. The exhaust gas turbocharger as defined in claim 2, wherein the axial bearing is embodied as an annular bearing.

11. The exhaust gas turbocharger as defined in claim 10, wherein the yoke is configured as an annular yoke that surrounds the bearing ring.

12. The exhaust gas turbocharger as defined in claim 11, wherein the second permanent magnets are embodied as annular magnets, and the coil as an annular coil.

13. An exhaust gas turbocharger comprising a shaft on which a turbine wheel and a compressor wheel sit and which is guided in radial bearings and in at least one axial bearing,
wherein the radial bearings are embodied as passive magnetic bearings having permanent magnets generating axial magnetic fluxes; and the axial bearing is embodied as an active magnetic bearing having an electromagnet, an axial sensor, and a controller for controlling the electrical current impinging upon the electromagnet, and
wherein the radial bearings each have a bearing ring sitting on the shaft, and at least one radial bearing stator located axially opposite the bearing ring on at least one side, the permanent magnets being provided both on the bearing rings and on the radial bearing stators.

14. The exhaust gas turbocharger as defined in claim 13, wherein the radial bearing stators have several partial stators, with permanent magnets, distributed over the circumference.

15. The exhaust gas turbocharger as defined in claim 13, wherein the radial bearing stators are embodied as annular stators and the permanent magnets as annular magnets.

16. The exhaust gas turbocharger as defined in claim 13, wherein two of the radial bearings are present, between which the at least one axial bearing is arranged.

17. The exhaust gas turbocharger as defined in claim 13, wherein each bearing ring is enclosed on both sides by the radial bearing stators.

18. The exhaust gas turbocharger as defined in claim 17, wherein each two of the radial bearing stators are combined into a yoke that is U-shaped in cross section.

19. The exhaust gas turbocharger as defined in claim 13, wherein several of the permanent magnets are arranged next to one another in the radial direction.

20. The exhaust gas turbocharger as defined in claim 19, wherein the permanent magnets on the radial bearing stator and the bearing ring are in contact with one another in the radial direction.

21. The exhaust gas turbocharger as defined in claim 19, wherein each two of the adjacent permanent magnets in the radial direction are oppositely polarized.

22. The exhaust gas turbocharger as defined in claim 13, wherein the at least one radial bearing stator is supported via spring and damper elements on a housing-mounted part of the exhaust gas turbocharger.

23. The exhaust gas turbocharger as defined in claim 22, wherein the spring elements are embodied as axially extending torsion springs.

24. The exhaust gas turbocharger as defined in claim 23, wherein each radial bearing stator is connected to the housing-mounted part via the torsion springs distributed over the circumference.

25. The exhaust gas turbocharger as defined in claim 24, wherein the torsion springs are each part of a cage that connects the ends of the torsion springs via cage rings.

26. The exhaust gas turbocharger as defined in claim 25, wherein the cage surrounds the respective radial bearing stators.

27. The exhaust gas turbocharger as defined in claim 22, wherein the radial bearing stator or stators are braced against the housing-mounted part by way of at least one damping element.

28. The exhaust gas turbocharger as defined in claim 27, wherein the damping element is embodied annularly and coaxially with respect to the shaft.

29. The exhaust gas turbocharger as defined in claim 27, wherein the damping elements are embodied as liquid films.

30. The exhaust gas turbocharger as defined in claim 29, wherein the liquid films contain magnetic or magnetizable particles and are magnetically impinged upon on at least one side by a permanent magnet.

31. The exhaust gas turbocharger as defined in claim 30, wherein the permanent magnets are part of the radial bearings.

32. An exhaust gas turbocharger comprising:
a shaft;
turbine wheel on the shaft;
a compressor wheel on the shaft;

passive magnetic radial bearings guiding the shaft, the radial bearings comprising first permanent magnets generating axial magnetic fluxes; and at least one active magnetic axial bearing guiding the shaft, the axial bearing comprising a radially projecting bearing ring on the shaft made of magnetizable material, at least one yoke made of ferromagnetic material and forming at least one axial bearing stator that encloses the bearing ring to establish magnetic gaps, at least one pair of axially oppositely polarized second permanent magnets arranged axially next to one another in the yoke, an electromagnetic coil arranged radially adjacently as an electromagnet, an axial sensor, and a controller for controlling the magnetic flux in the coil and in the magnetic gaps in such a manner that the bearing ring is held in the yoke in an axially defined position.

* * * * *